(12) United States Patent
Zaidi

(10) Patent No.: US 12,449,338 B2
(45) Date of Patent: Oct. 21, 2025

(54) HOLDER FOR DROP TESTER

(71) Applicant: ZT GROUP INT'L, INC., Secaucus, NJ (US)

(72) Inventor: Syed Kausar A Zaidi, Middlesex, NJ (US)

(73) Assignee: ZT GROUP INT'L, INC., Secaucus, NJ (US)

( * ) Notice: Subject to any disclaimer, the term of this patent is extended or adjusted under 35 U.S.C. 154(b) by 489 days.

(21) Appl. No.: 18/187,410

(22) Filed: Mar. 21, 2023

(65) Prior Publication Data

US 2024/0319059 A1    Sep. 26, 2024

(51) Int. Cl.
*G01N 3/303* (2006.01)

(52) U.S. Cl.
CPC .................................. *G01N 3/303* (2013.01)

(58) Field of Classification Search
None
See application file for complete search history.

(56) References Cited

U.S. PATENT DOCUMENTS 6,807,841 B1 * 10/2004 Chen ...................... G01N 3/303
                                                              73/12.06
8,453,491 B2 *  6/2013 Yu ........................... G01M 7/08
                                                              73/12.06

FOREIGN PATENT DOCUMENTS

| CN | 109115634 A | * | 1/2019 | ............... G01N 3/06 |
| KR | 20100060057 A | * | 6/2010 | ............... G01M 7/08 |

* cited by examiner

Primary Examiner — Peter J Macchiarolo
Assistant Examiner — Jermaine L Jenkins
(74) Attorney, Agent, or Firm — SCULLY, SCOTT, MURPHY & PRESSER, P.C.

(57) ABSTRACT

A holder is provided. The holder includes a body and a plurality of fingers received by the body. Each of the plurality of fingers are operable to be translatable within the body to modify the configuration of the fingers. The fingers are operable to be reconfigured to correspond with a drop unit such that the drop unit is held in a desired orientation between the fingers and a drop leaf of a drop tester.

20 Claims, 14 Drawing Sheets

HOLDER FOR DROP TESTER

FIELD

The present disclosure relates generally to a holder operable to be installed with a drop tester for flat, corner, and/or edge drops.

BACKGROUND

Test procedures and industry standards specify the requirement for controlled orientation drops of drop units (e.g., boxes, containers, receptacles, etc.) that result in impacts on predetermined faces, corners, and/or edges. Specific drop heights and orientations are controlled and required, for example by International Safe Transit Association (ISTA). Drop testers are used to perform pre-shipment testing of drop units to design and verify cost-effective, optimized protective packaging solutions. The transport and distribution environment holds numerous package opportunities to experience impacts and drops. As a result, shock is transmitted into and through a given package.

BRIEF DESCRIPTION OF THE DRAWINGS

Implementations of the present technology will now be described, by way of example only, with reference to the attached figures, wherein.

DETAILED DESCRIPTION

Figure 1A:
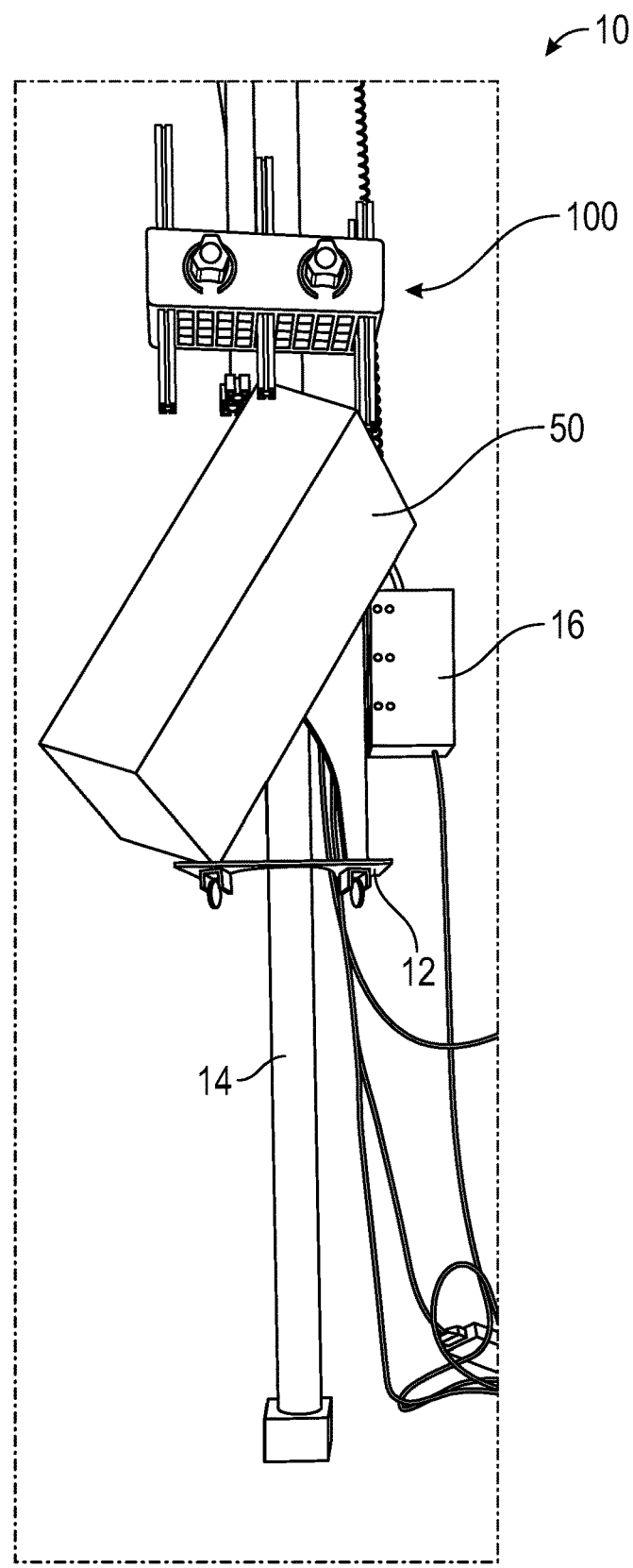
FIG. 1A is a front view of a drop tester with a holder according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented. The term "coupled" is defined as connected, whether directly or indirectly through intervening components, and is not necessarily limited to physical connections. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "about" means reasonably close to the particular value. For example, about does not require the exact measurement specified and can be reasonably close. As used herein, the word "about" can include the exact number. The term "near" as used herein is within a short distance from the particular mentioned object. The term "near" can include abutting as well as relatively small distance beyond abutting. The terms "comprising," "including" and "having" are used interchangeably in this disclosure. The terms "comprising," "including" and "having" mean to include, but not necessarily be limited to the things so described.

A drop tester can drop test drop units weighing up to 177 pounds (80 kilograms). The drop height is set using a hand-held controller and an automatically adjusted electric hoist. The drop leaf uses pneumatic actuation to drop test drop units. Also, the drop tester can include a hand-held controller for machine setup and operation. During use, the controller can be utilized to hoist the drop leaf up or down to a desired height. A holder can be utilized to hold the drop unit between the holder and the drop leaf in a desired orientation. The drop leaf can then move to allow the drop unit to fall and impact a surface (e.g., the ground) in the desired orientation to ensure that a desired portion (e.g., flat surface, edge, corner) of the drop unit impacts the surface.

The conventional holders could not hold server test packages before dropping for edge drops and/or corner drops. For example, conventional holders may include a rectangular slab stacked with foam to hold drop units. The rigidity of conventional holders cannot support even an empty drop unit on its diagonal corners or hard-to-place corners/edges. During conventional testing, the machine operator must hold the drop unit manually, which is challenging for large and/or heavy drop units. After a drop, the drop unit can roll or flip towards the operator, leading to unsafe working conditions or injury.

The holder as disclosed herein includes a plurality of fingers that can be translated within a body to be configured to safely and securely hold the drop unit in the desired orientation. In at least one example, the holder can be retrofittedly coupled with a conventional drop tester. The holder can support a variety of drop unit shapes and/or sizes at the desired orientation in a short time and can be reconfigured to correspond with the drop unit and the desired orientation easily and efficiently. Accordingly, the user can keep a safe distance from the test area.

Figure 1B:
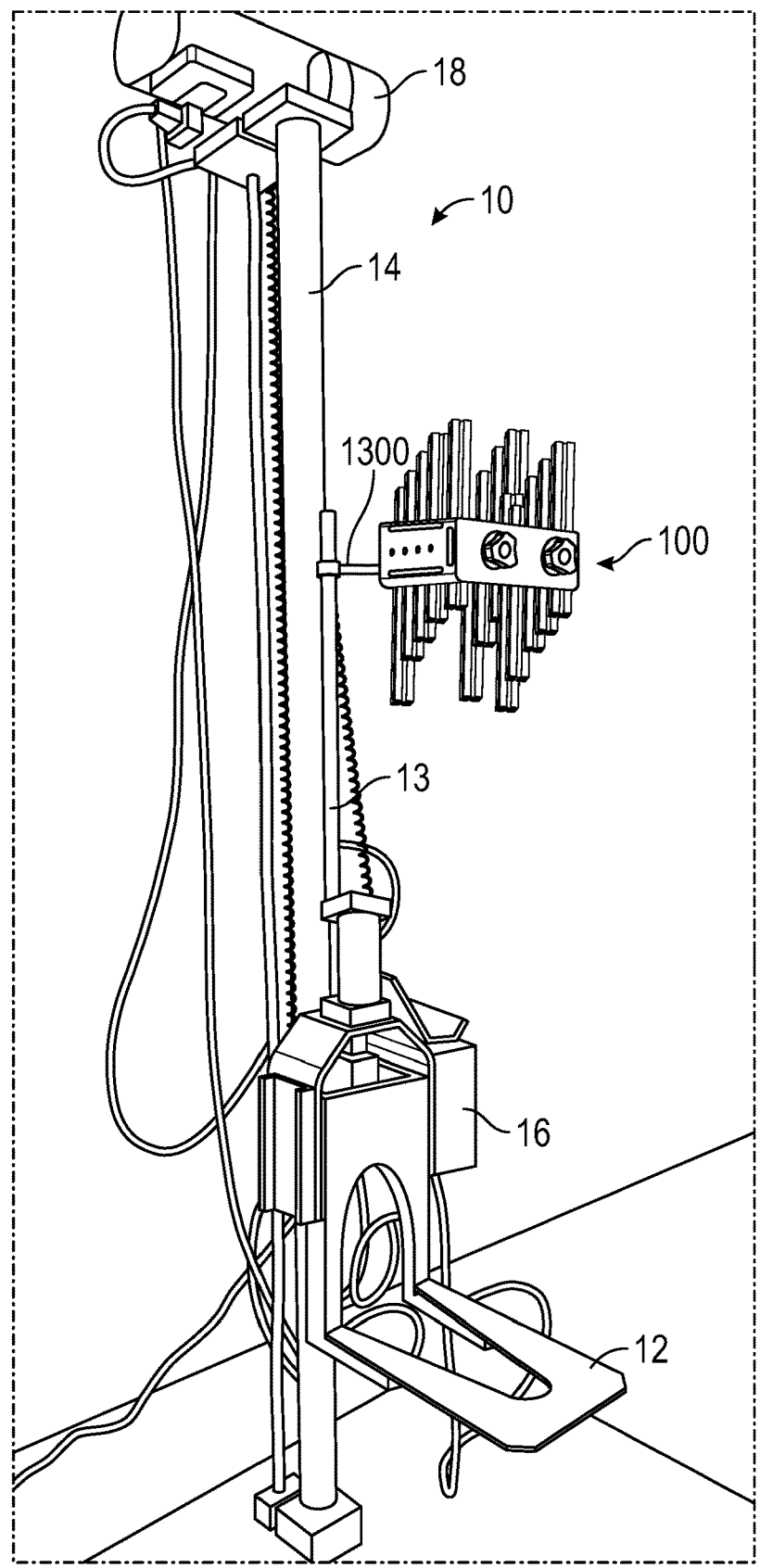
FIG. 1B is a perspective view of the computing system of FIG. 1A.
Figure 1C:
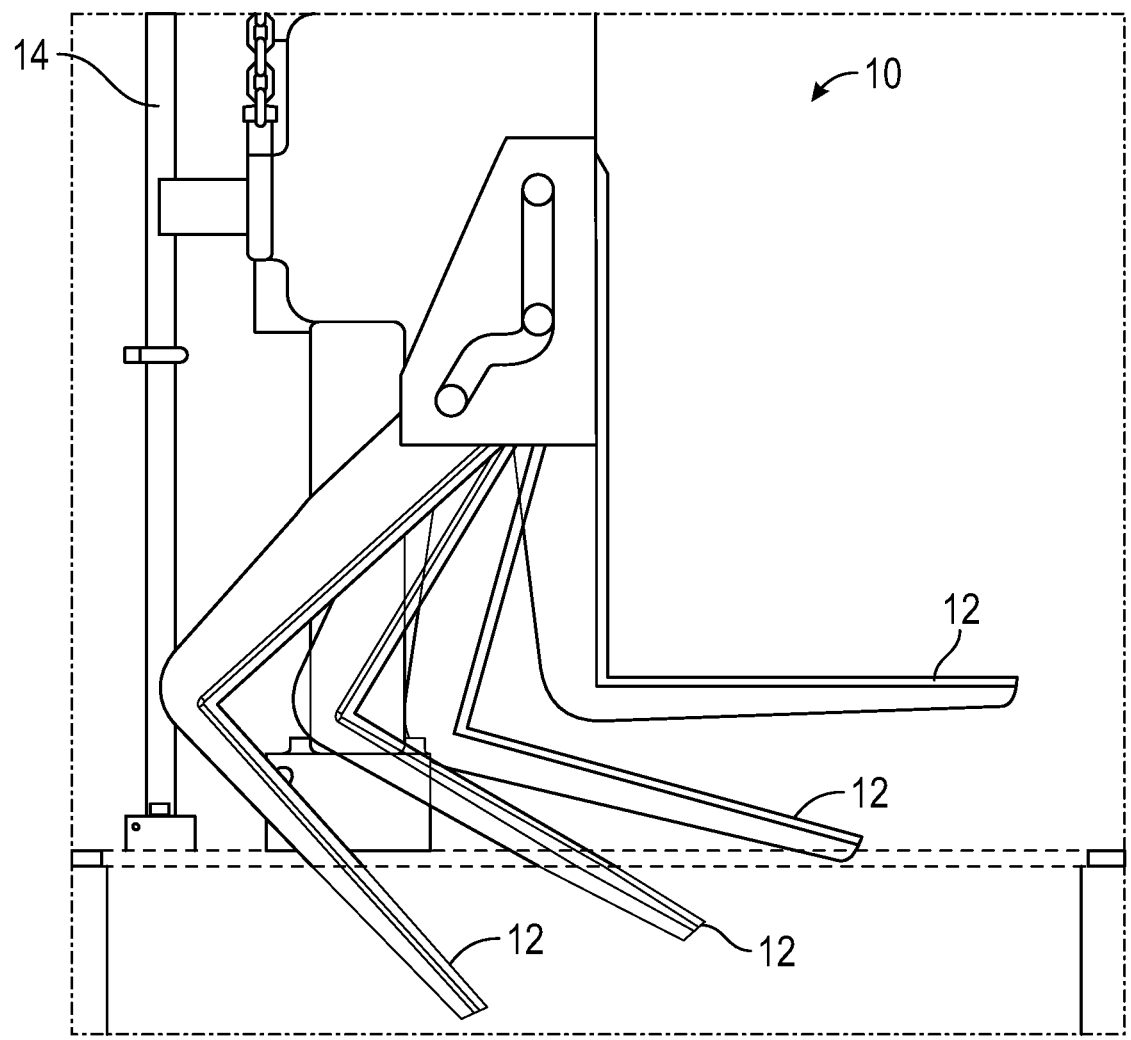
FIG. 1C is a side view illustrating the movement of a drop leaf of the drop tester.

The disclosure now turns to FIGS. 1A, 1B, and 1C, which illustrate an example of a holder 100 to be used with a drop tester 10. FIG. 1A illustrates a front view of the drop tester 10, FIG. 1B illustrates a perspective view of the drop tester 10, and FIG. 1C illustrates the drop movement of the drop leaf 12 of the drop tester 10.

To fulfill customer requirements, drop tests on all drop units 50 are conducted with a drop tester 10. The drop height and orientation are controlled. For example, the drop height and orientation can be controlled and explained in the ISTA 2A procedure. Drop testers 10 are used to perform pre-shipment testing of drop units 50 to design and verify cost-effective, optimized protective packaging solutions. The transport and distribution environment holds numerous package opportunities to experience impacts and drops. As a result, shock is transmitted into and throughout a given drop unit 50.

The drop tester 10 includes a drop leaf 12. The drop leaf 12 is operable to receive a drop unit 50 before allowing the drop unit 50 to fall to test how the drop unit 50 handles impact. The drop unit 50 can include a box, a package, a container, and/or a receptacle. Other drop units 50 can be included without deviating from the scope of the disclosure. In at least one example, as illustrated in FIG. 1A, the drop unit 50 can be substantially rectangular. However, while the disclosure focuses on the drop unit 50 being rectangular with corners, edges, and/or flat surfaces, the drop unit 50 can have other shapes without deviating from the scope of the disclosure. In at least one example, as illustrated in FIGS. 1A and 1B, the drop leaf 12 can be coupled to a support 14, such as a pole, a stand, and/or any other suitable support structure that can hold the drop leaf 12 as well as withstand any movement by the drop leaf 12.

The drop tester 10 can include a holder 100. The holder 100 can be operable to hold the drop unit 50 in the desired orientation for the testing. The drop unit 50 can be held between the holder 100 and the drop leaf 12. In at least one example, the drop unit 50 can be sandwiched between the holder 100 and the drop leaf 12. The drop leaf 12 and the holder 100 can be operable to hold drop units 50, for example that can weigh up to 177 pounds (80 kilograms). In at least one example, as illustrated in FIG. 1B, the holder 100 can be coupled with the drop tester 10. In at least one example, the holder 100 can be coupled with a portion of the drop leaf 12 such that as the drop leaf 12 is raised and/or lowered, the holder 100 is raised and/or lowered with the drop leaf 12. In at least one example, the holder 100 can be slid up and down to accommodate different sizes of drop units 50. In at least one example, the holder 100 can be coupled with the drop tester 10 via a shaft 13. The shaft 13 can include an attachment 1300 that extends to directly couple with the holder 100. In at least one example, the shaft 13 is removably coupled with the drop tester 10. In at least one example, the holder 100 is removably coupled with the shaft 13. The holder 100 can be removably coupled with the drop tester 10. The holder 100 can be retrofittedly coupled with the drop tester 10. Accordingly, the holder 100 can be coupled with a conventional drop tester 10 without modifications to the drop tester 10. The holder 100 can improve the ability of the conventional drop tester 10 to be able to hold the drop unit 50 in the desired orientations for the testing (e.g., flat surface drop, edge drop, corner drop) without the need of a user to manually hold onto the drop unit 50. This provides for safer operation of the drop tester 10, as the user can be a safe distance from the drop tester 10 and control the drop tester 10 (e.g., drop leaf 12 and/or hoist 18) via a controller 16 (e.g., a remote).

The controller 16 can be in communication with a hoist 18. The hoist 18 can be operable to raise and/or lower the drop leaf 12 and/or the holder 100 to the desired height. In at least one example, the hoist 18 can be operable to raise and/or lower the drop leaf 12, the holder 100, and the drop unit 50 such that the drop unit 50 can be dropped from the desired height for the testing. In at least one example, the hoist 18 can be an automatically adjusted electric hoist. For example, the controller 16 can control the hoist 18 to raise and/or lower the drop leaf 12 and/or the holder 100 to the desired height for the testing. In at least one example, a user may input a height (e.g., 36 inches), and the hoist 18 can automatically adjust the drop leaf 12 and/or the holder 100 to the desired height such that the drop unit 50 would drop from 36 inches. In at least one example, the controller 16 can control the hoist 18 to raise and/or lower the drop leaf 12 and/or the holder 100 to a height between about 18 inches to about 72 inches. In some examples, the drop leaf 12 and the holder 100 can move together to the desired height set by the controller 16.

The drop leaf 12 can be operable to move such that the drop unit 50 falls from the drop leaf 12 in the desired orientation. Accordingly, the desired portion of the drop unit 50 (e.g., flat surface, corner, edge) receives the impact from the fall. In at least one example, the controller 16 can be in communication with the drop leaf 12 such that a user can control, via the controller 16, the drop leaf 12 to move to allow the drop unit 50 to fall from the drop leaf 12. As illustrated in FIG. 1C, the drop leaf 12 can be operable to move to drop the drop unit 50 in the desired orientation. In at least one example, the drop leaf 12 can use pneumatic actuation to drop the drop unit 50. The drop leaf 12 can move down, pivot, and/or rotate such that the drop unit 50 falls in the desired orientation. In at least one example, to allow the drop unit 50 to fall in the desired orientation, the drop leaf 12 can move faster than the drop unit 50 would fall. FIG. 1C illustrates an example of the drop leaf 12 in different stages of movement.

FIGS. 2A-2F illustrate the holder 100. The holder 100 can include a body 102. The body 102 can be operable to receive a plurality of fingers 200. The plurality of fingers 200 are operable to each be translatable within the body 102 to modify the configuration of the fingers 200. When the fingers 200 are reconfigured, the fingers 200 are operable to correspond with the drop unit 50 such that the drop unit 50 is held in the desired orientation between the fingers 200 and the drop leaf 12.

As illustrated in FIGS. 2A-2F, the body 102 can be substantially rectangular. For example, the body 102 can include a front 1020, a rear 1022 opposite the front 1020, a first side 1024, and a second side 1026 opposite the first side 1024. In at least one example, the front 1020 and the rear 1022 can be substantially parallel, and the first side 1024 and the second side 1026 can connect the front 1020 and the rear 1022 and be substantially parallel. In other example, the body 102 can have other shapes such as circular, ovoid, triangular, etc. without deviating from the scope of the disclosure.

The holder 100 includes a locking mechanism 104. The locking mechanism 104 is operable to maintain the configuration of the fingers 200 in relation to the body 102. For example, when the locking mechanism 104 is in a lock configuration, the configuration of the fingers 200 is maintained in relation to the body 102. In other words, the fingers 200 do not move in relation to the body 102. When the locking mechanism 104 is in an unlocked configuration, the fingers 200 can be translatable within the body 102. For example, the fingers 200 can slide within the body 102. In at least one example, each of the fingers 200 can be individually translatable such that each finger 200 can move independently within the body 102. Since each finger 200 is independently translatable and lockable, the fingers 200 can better adapt and correspond with the shape, size, and/or orientation of the drop unit 50 to hold the drop unit 50 in place and orientation.

Figure 2A:
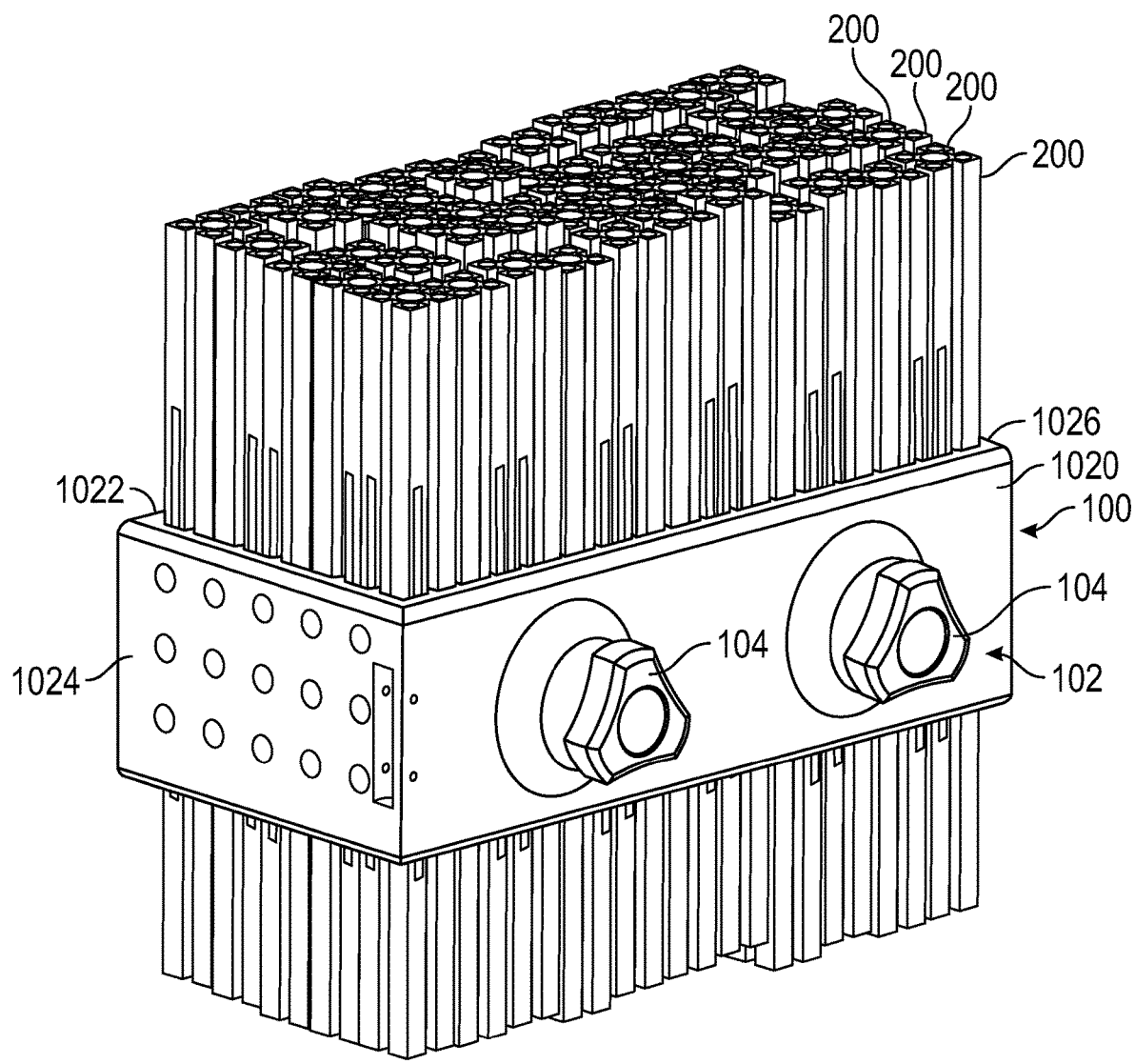
FIG. 2A is a front perspective view of a holder.
Figure 2B:
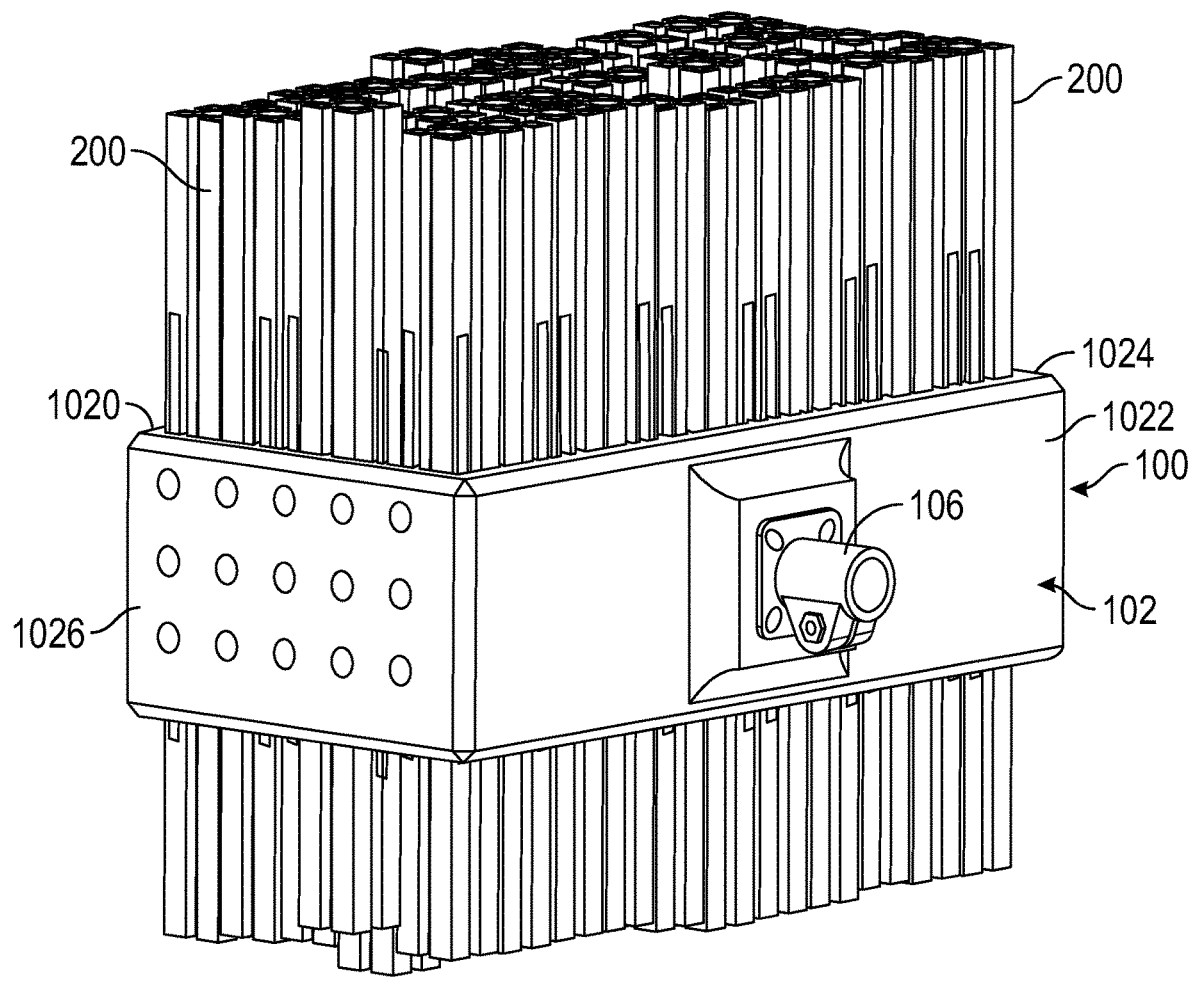
FIG. 2B is a rear perspective view of the holder.
Figure 2C:
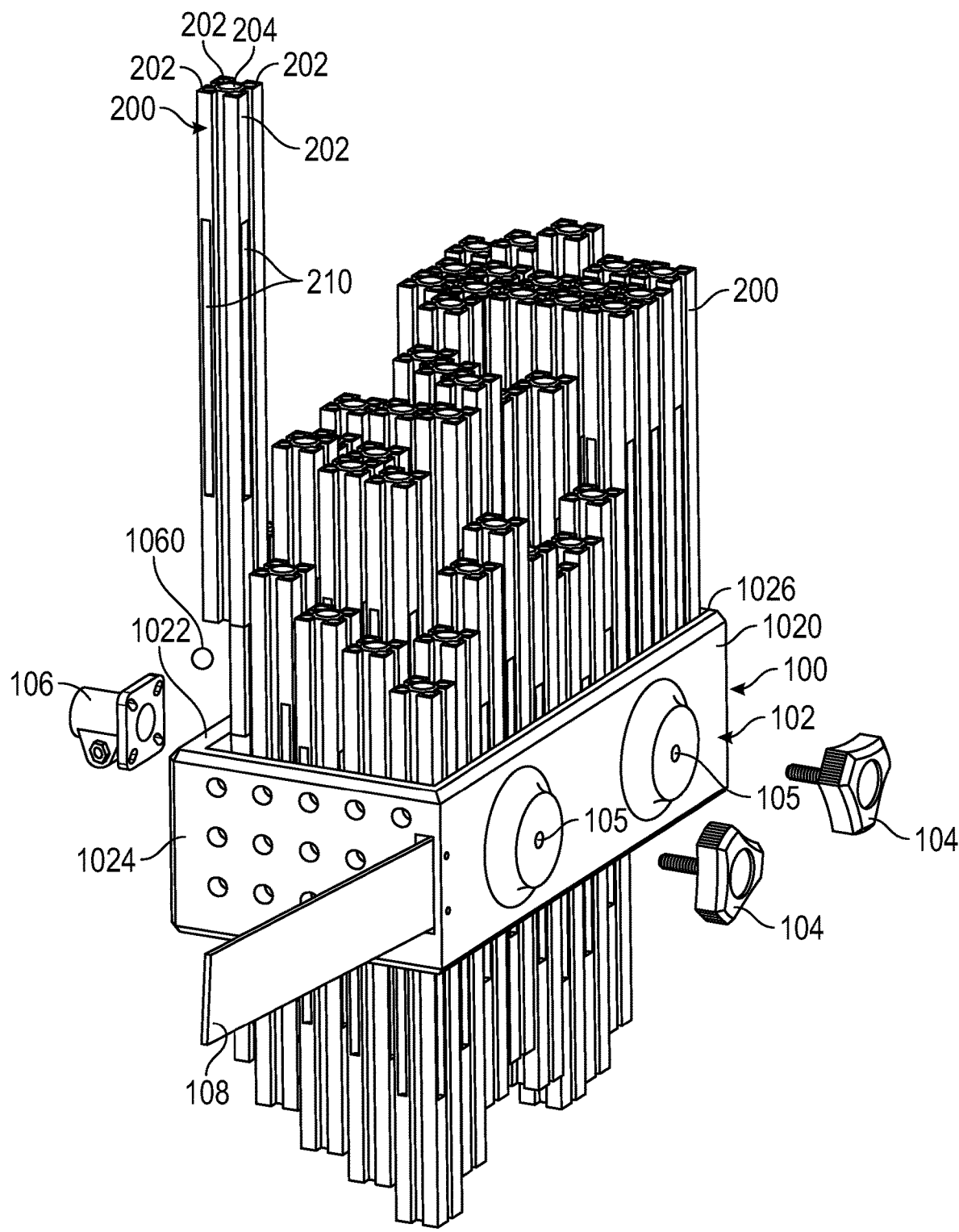
FIG. 2C is a partially exploded view of the holder.

In at least one example, the locking mechanism 14 can include a compression plate 108 (as shown in FIG. 2C) that is operable to compress against the fingers 200 to transition the locking mechanism 14 to the lock configuration. In at least one example, the compression plate 108 can be received in a slot 1080 in the body 102 (for example the front 1020 of the body 102). In at least one example, the locking mechanism 14 can include one or more compression screws 1040 operable to be tightened to press against the compression plate 108 to transition the locking mechanism 104 to the lock configuration. For example, the compression plate 108 can be received in the front 1020 of the body 102. The front 1020 of the body 102 can form screw holes 105 that correspond with and are operable to receive the compression screws 1040.

In at least one example, when the compression screws 1040 are tightened (e.g., pushed further towards the fingers 200), the compression screws 1040 press against the compression plate 108 to transition the locking mechanism 104 to the locked configuration. The compression plate 108 then presses against the fingers 200 (e.g., a lateral side of the fingers 200) to push the fingers 200 against each other and/or against the body 102 (e.g., against the rear 1022). Accordingly, the friction formed by the force of the fingers 200 pushed against one another and/or the body 102 prevents the fingers 200 from moving in relation to one another and/or in relation to the body 102. The locking mechanism 104 is then in the locked configuration.

To transition the locking mechanism 104 from the locked configuration to the unlocked configuration, the compression screws 1040 can be loosened (e.g., moved away from the fingers 200). The compression plate 108 releases from the fingers 200 by moving towards the front 1020 of the body 102 away from the fingers 200. The fingers 200 then are not pushed against one another with as much force, and the fingers 200 can then move, slide, and/or translate in relation to one another and/or the body 102.

Figure 2D:
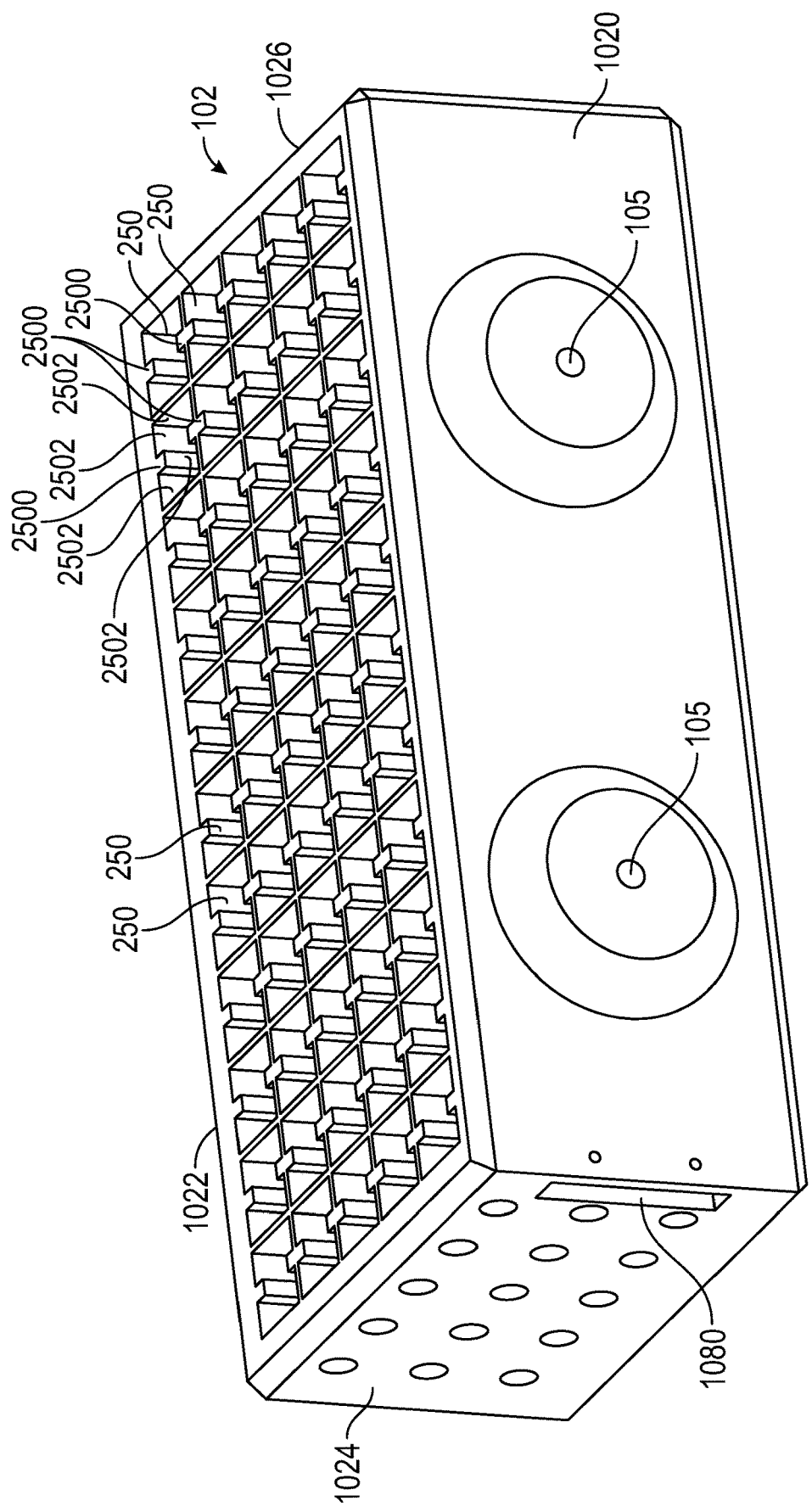
FIG. 2D is a perspective view of a body of the holder.

As illustrated in FIG. 2D, the body 102 can form a plurality of finger guides 250 that are each operable to receive a corresponding finger 200. In at least one example, referring to FIGS. 2D, 2E, and 2F, the finger guides 250 and the fingers 200 can be shaped such that the fingers 200 are not rotatable when received in the corresponding finger guides 250. The fingers 200 can form one or more protrusions 202 and/or one or more recesses 2020. Correspondingly, the finger guides 250 can form one or more protrusions 2500 and/or one or more recesses 2502. When the fingers 200 are received in the finger guides 250, the protrusions 202 of the fingers 200 can be received in the recesses 2502 of the finger guides 250 and/or the recesses 2020 of the fingers 200 can receive the protrusions 2500 of the finger guides 250. Accordingly, the fingers 200 do not rotate when received in the finger guides 250 of the body 102, and the fingers 200 can more stably receive and hold the drop unit 50.

In at least one example, the body 102 includes a retainment component 1060. The retainment component 1060 is operable to keep the fingers 200 within and/or coupled with the body 102, for example when the locking mechanism 104 is in the unlocked configuration. When the locking mechanism 104 is in the unlocked configuration, the fingers 200 are loose and can translate and/or slide down in relation to the body 102 due to gravity. Accordingly, the retainment component 1060 retains the fingers 200 within the body 102.

Figure 2E:
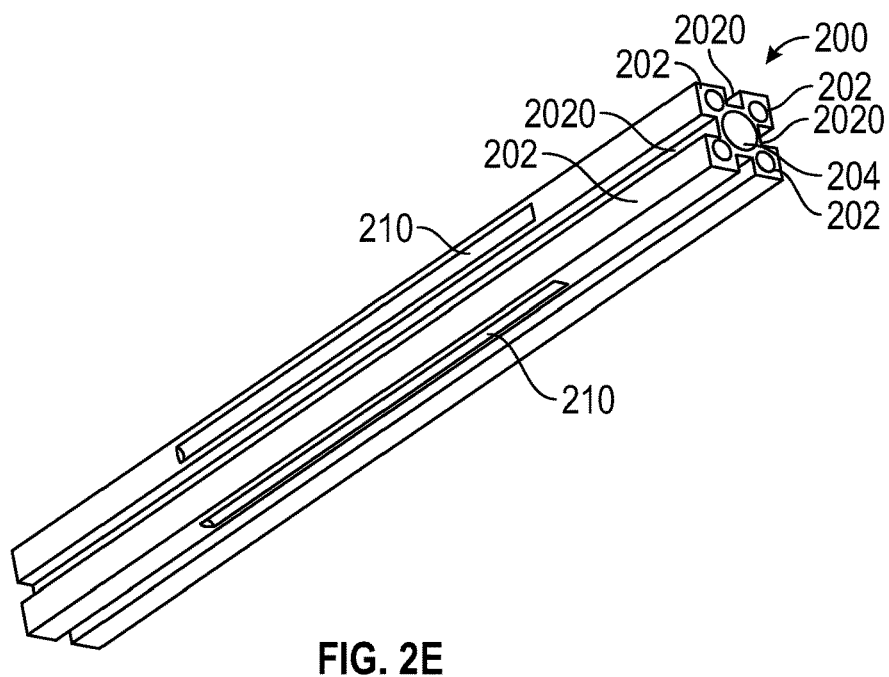
FIG. 2E is a perspective view of a finger of the holder.

In at least one example, the retainment component can include one or more balls (e.g., substantially spheres) which are operable to keep each corresponding finger 200 within the body 102 when the locking mechanism 104 is in the unlocked configuration and the fingers 200 are free to slide down due to gravity. In at least one example, the fingers 200 can each form a slot 210 which is operable to receive the corresponding retainment component 1060. The slot 210 can be formed in each of the protrusions 202, for example as illustrated in FIGS. 20, 2E, and 2G. As illustrated in FIG. 2G, the slot 210 can be substantially equal to half of the diameter of the retainment component 1060. In at least one example, as illustrated in FIG. 2G, each pair of fingers 200 can have one shared retainment component 1060. In at least one example, as illustrated in FIG. 2H, the body 102 can form a plurality of cavities 2510 which is operable to correspond with the slots 210 of the fingers 200. The cavities 2510 can be operable to receive a portion of the retainment component 1060. Accordingly, the cavities 2510, along with the corresponding slots 210 of the fingers 200, are operable to receive the retainment components 1060. The cavities 2510 and the slots 210 do not extend to the ends of the body 102 and the fingers 200. Accordingly, the cavities 2510 and the slots 210 restrict the travel of the retainment components 1060 and thus prevents the fingers 200 from completely sliding out from the body 102.

Figure 2F:
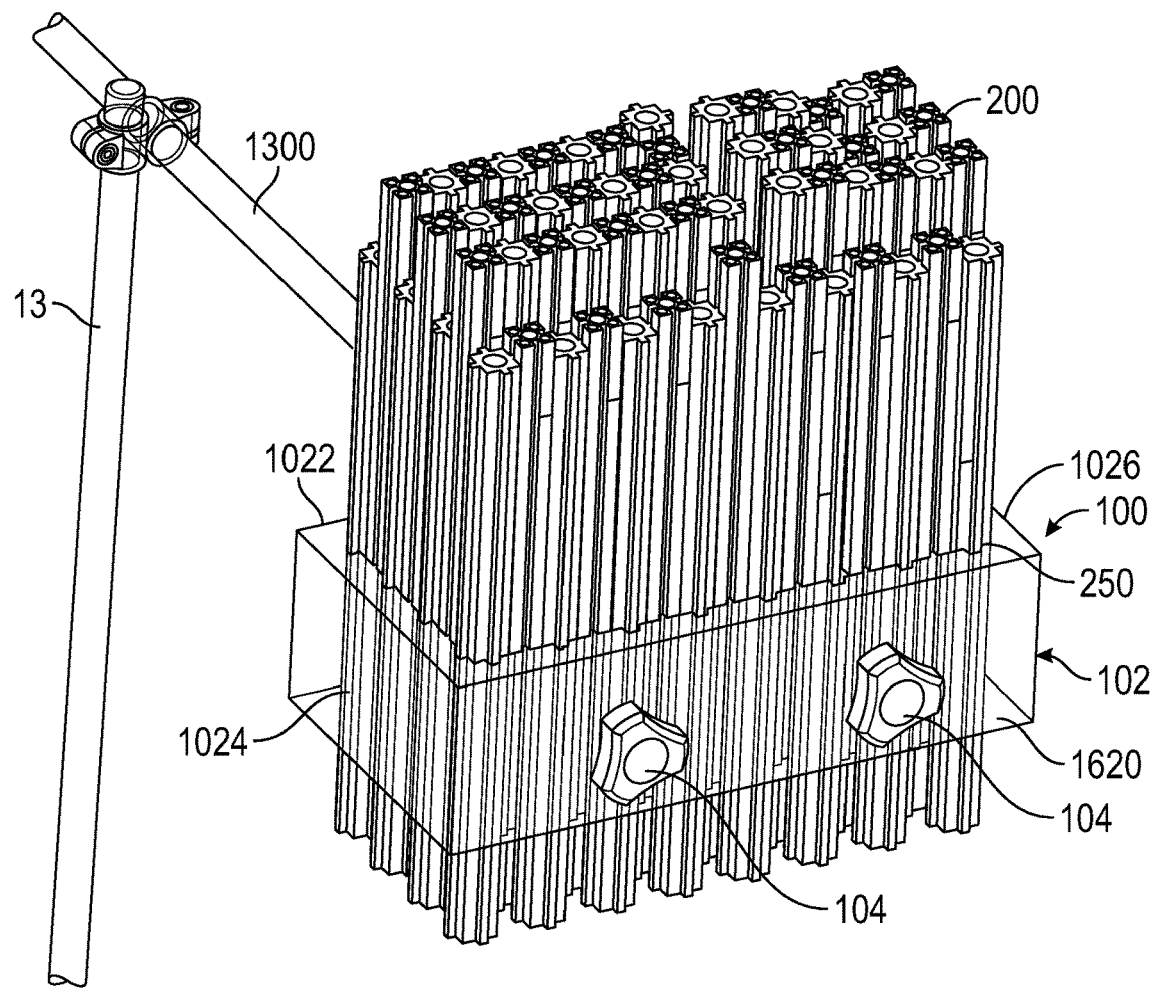
FIG. 2F is a perspective view of the holder with the body being transparent.
Figure 2G:
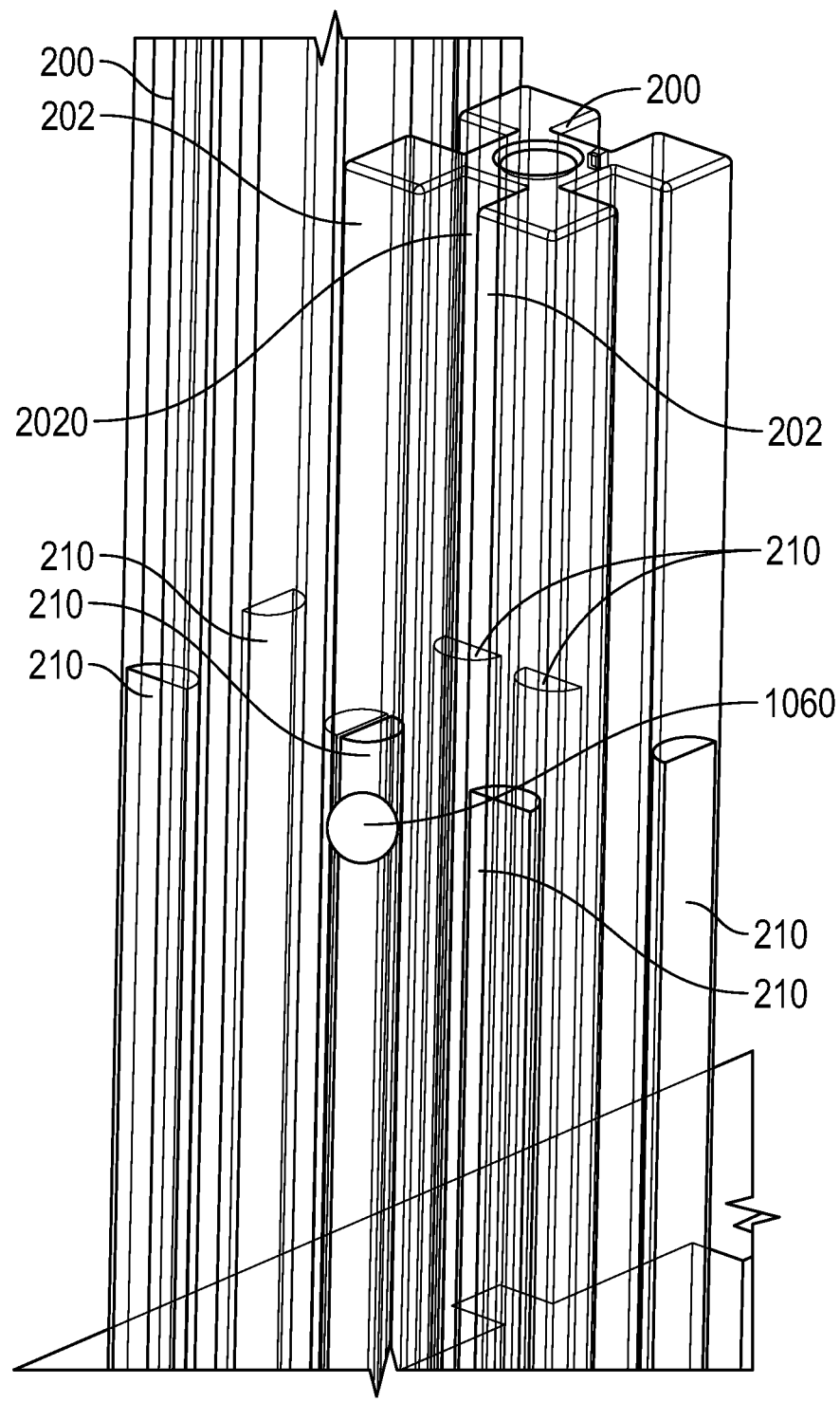
FIG. 2G is an enlarged view of two fingers interacting with a retainment component.
Figure 2H:
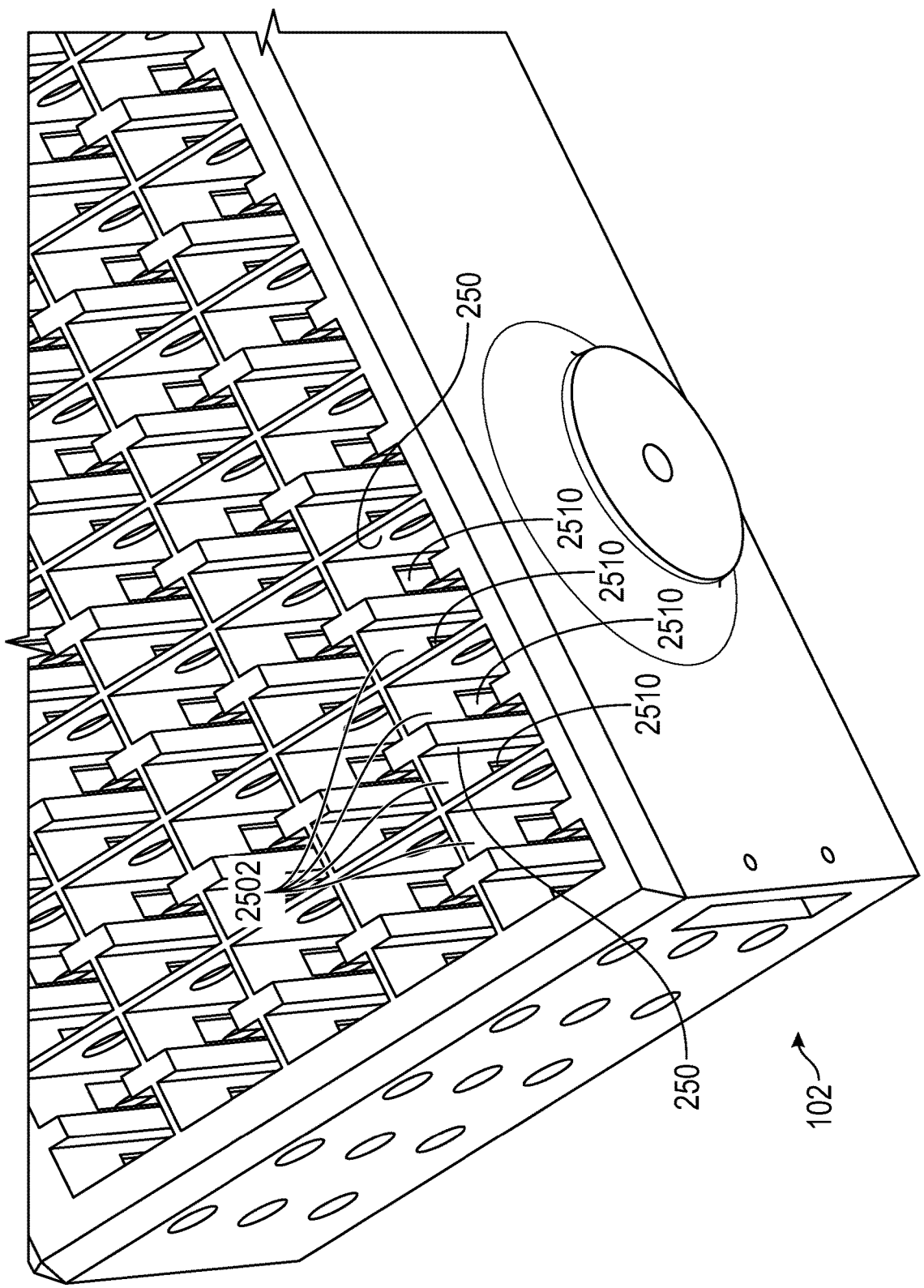
FIG. 2H is an enlarged view of the body, showing slots that receive the retainment components.

Referring to FIGS. 2B, 2C, and 2F, the body 102 can include a coupling mechanism 106 such that the body 102 is operable to be coupled to the drop tester 10. As discussed above, in at least one example, the body 102 can be retrofittedly coupled to a conventional drop tester 10 without modifications to the drop tester 10. In at least one example, the coupling mechanism 106 can include a shaft holder coupled to the body 102. The shaft holder can be operable to receive a shaft 13 and/or an attachment 1300 of the shaft 13. The shaft 13 can be coupled to the drop tester 10. For example, the shaft 13 can be coupled to a conventional drop tester 10.

Figure 3A:
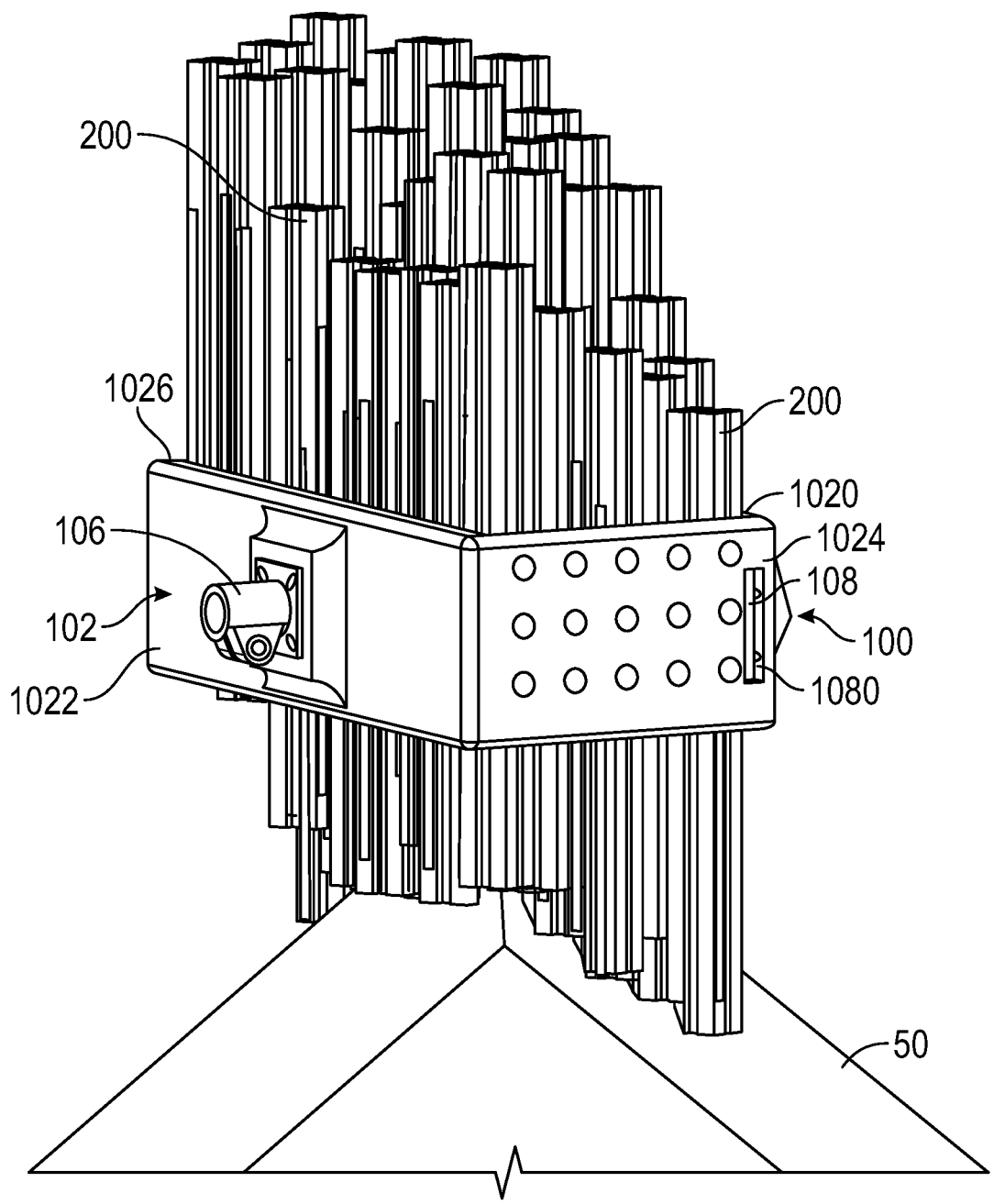
FIG. 3A is a rear perspective view of the holder holding a drop unit in a desired orientation.
Figure 3B:
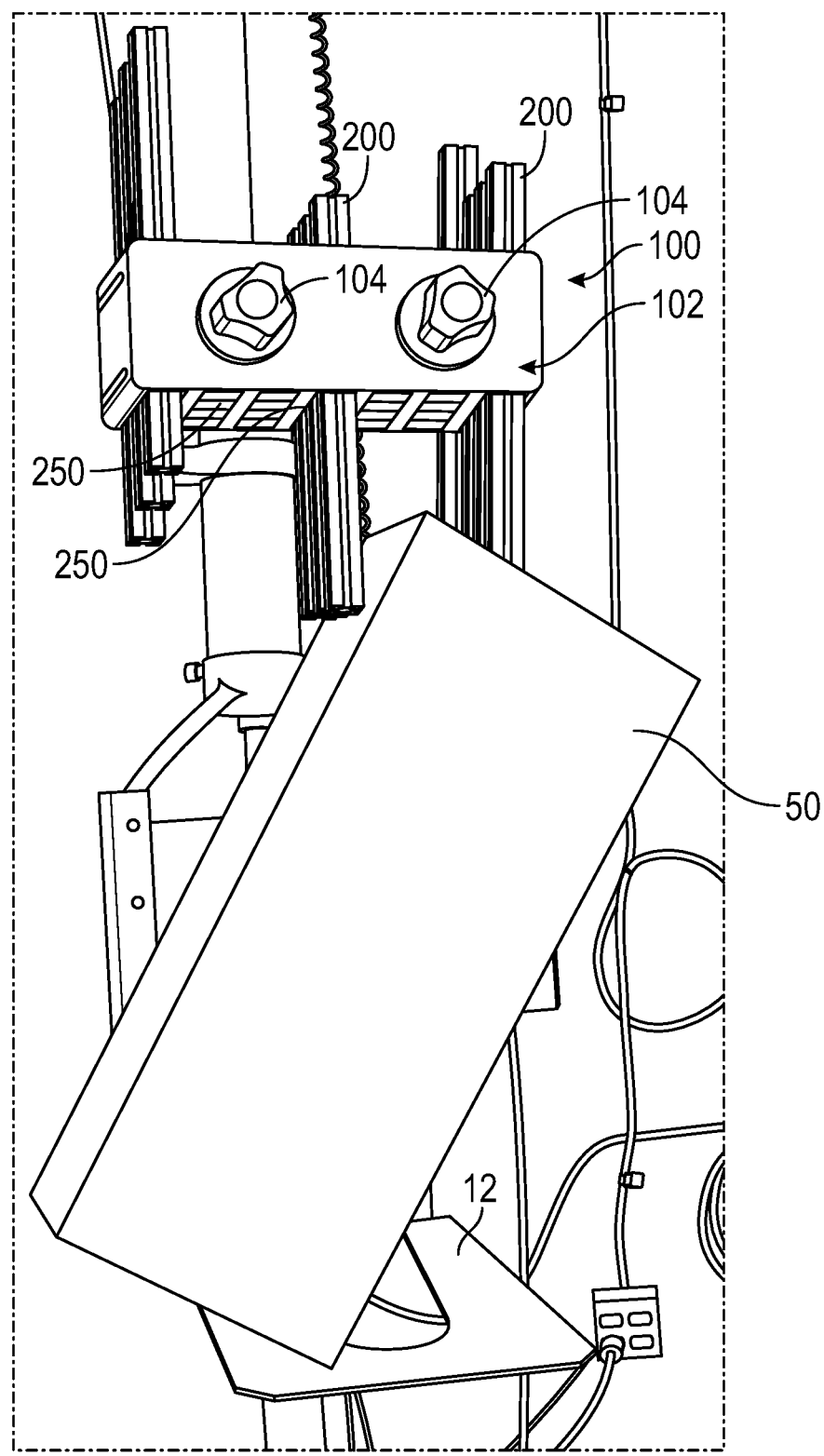
FIG. 3B is a front perspective view of the drop tester with the holder holding a drop unit in the desired orientation.

As illustrated in FIGS. 3A and 3B, the fingers 200 are reconfigured to correspond with the size, shape, and/or orientation of the drop unit 50. The fingers 200 are reconfigured to correspond with and hold the corner and/or edge of the drop unit 50. With the holder 100, the drop unit 50 can be held in the desired orientation against the drop leaf 12 without a user needed to manually hold the drop unit 50 in position before the drop for testing. This provides a safer working environment to perform the testing.

Figure 4A:
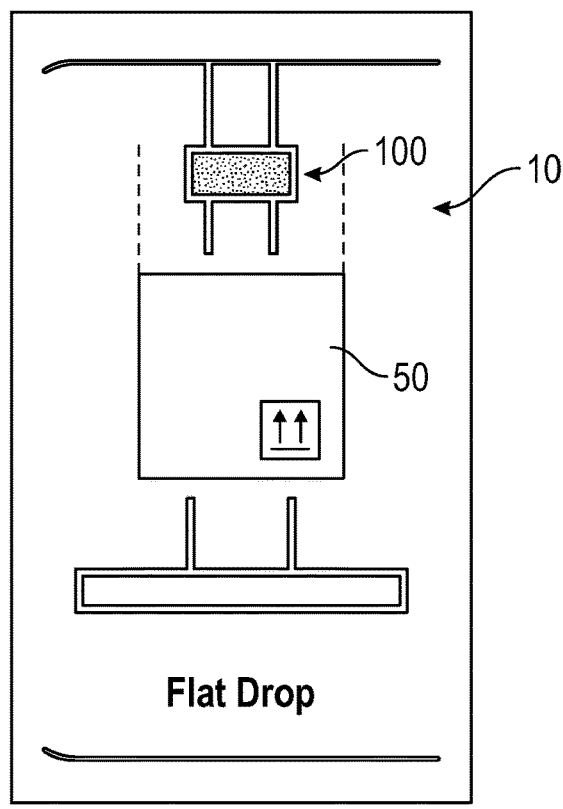
FIG. 4A is a diagram illustrating a flat drop of the drop unit.
Figure 4B:
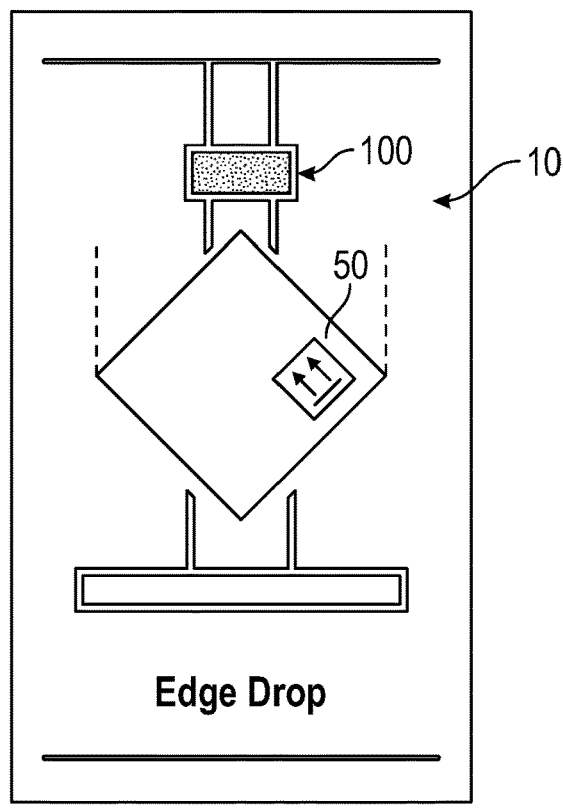
FIG. 4B is a diagram illustrating an edge drop of the drop unit.
Figure 4C:
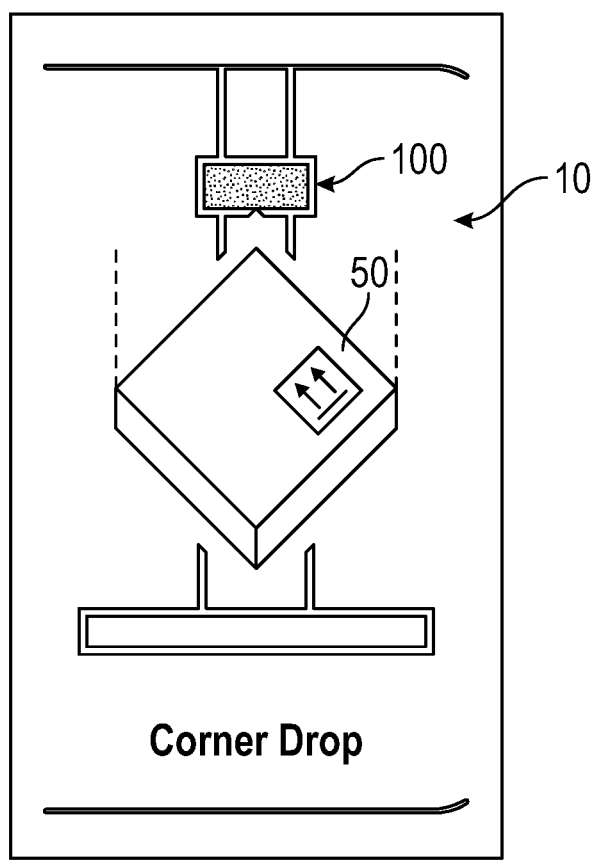
FIG. 4C is a diagram illustrating a corner drop of the drop unit.

The holder 100 is reconfigurable for any orientation of the drop unit 50 during testing. For example, as shown in FIGS. 4A-4C, the desired orientation of the drop unit 50 during the testing can include a flat orientation (see FIG. 4A) such that the drop unit 50 falls on a flat side, an edge orientation (see FIG. 4B) such that the drop unit 50 falls on an edge, and/or a corner orientation (see FIG. 4C) such that the drop unit 50 falls on a corner.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A holder comprising:
a body;
a plurality of fingers received by the body,
wherein each of the plurality of fingers operable to be translatable within the body to modify the configuration of the fingers;
wherein the fingers are operable to be reconfigured to correspond with a drop unit such that the drop unit is held in a desired orientation between the fingers and a drop leaf of a drop tester.

2. The holder of claim 1, wherein the fingers are operable to be reconfigured to correspond with and hold a corner and/or edge of the drop unit.

3. The holder of claim 1, further comprising a locking mechanism; wherein when the locking mechanism is in a lock configuration, the configuration of the fingers is maintained in relation to the body; wherein when the locking mechanism is in an unlocked configuration, the fingers are translatable within the body.

4. The holder of claim 3, wherein the locking mechanism includes a compression plate that is operable to compress against the fingers to transition the locking mechanism to the lock configuration.

5. The holder of claim 4, wherein the locking mechanism includes one or more compression screws operable to be tightened to press against the compression plate to transition the locking mechanism to the lock configuration.

6. The holder of claim 3, further including a retainment component operable to keep the fingers within and/or coupled with the body, when the locking mechanism is in the unlocked configuration.

7. The holder of claim 1, wherein the body forms a plurality of finger guides that are each operable to receive a corresponding finger of the plurality of fingers.

8. The holder of claim 7, wherein the plurality of finger guides and the plurality of fingers are shaped such that the fingers are not rotatable when received in the corresponding finger guides.

9. The holder of claim 1, wherein the body includes a coupling mechanism such that the body is operable to be retrofittedly coupled to a conventional drop tester.

10. The holder of claim 9, wherein the coupling mechanism includes a shaft holder coupled to the body, wherein the shaft holder is operable to receive a shaft that is coupled to the conventional drop tester.

11. A drop tester comprising:
a drop leaf,
a holder including:
a body;
a plurality of fingers received by the body,
wherein each of the plurality of fingers operable to be translatable within the body to modify the configuration of the fingers;
wherein the fingers are operable to be reconfigured to correspond with a drop unit such that the drop unit is held in a desired orientation between the fingers and the drop leaf;
wherein the drop leaf is operable to move such that the drop unit falls from the drop leaf in the desired orientation.

12. The drop tester of claim 11, wherein the fingers are operable to be reconfigured to correspond with and hold a corner and/or edge of the drop unit.

13. The drop tester of claim 11, further comprising a locking mechanism; wherein when the locking mechanism is in a lock configuration, the configuration of the fingers is maintained in relation to the body; wherein when the locking mechanism is in an unlocked configuration, the fingers are translatable within the body.

14. The drop tester of claim 13, wherein the locking mechanism includes a compression plate that is operable to compress against the fingers to transition the locking mechanism to the lock configuration.

15. The drop tester of claim 14, wherein the locking mechanism includes one or more compression screws operable to be tightened to press against the compression plate to transition the locking mechanism to the lock configuration.

16. The drop tester of claim 13, wherein the holder further includes a retainment component operable to keep the fingers within and/or coupled with the body, when the locking mechanism is in the unlocked configuration.

17. The drop tester of claim 11, wherein the body forms a plurality of finger guides that are each operable to receive a corresponding finger of the plurality of fingers.

18. The drop tester of claim 17, wherein the plurality of finger guides and the plurality of fingers are shaped such that the fingers are not rotatable when received in the corresponding finger guides.

19. The drop tester of claim 11, wherein the body includes a coupling mechanism such that the body is operable to be coupled to the drop tester, wherein the coupling mechanism includes a shaft holder coupled to the body, wherein the shaft holder is operable to receive a shaft that is coupled to the drop tester.

20. The drop tester of claim 11, further comprising a hoist operable to raise and/or lower the holder and/or the drop leaf.

* * * * *